(12) United States Patent
Beales

(10) Patent No.: US 7,773,711 B2
(45) Date of Patent: Aug. 10, 2010

(54) METHOD AND SYSTEM FOR DETECTING TRANSMITTED DATA SIGNAL QUALITY AND INTEGRITY

(76) Inventor: Stephen Beales, Victoria Road, Saltaire, Shipley, BD18 3LF (GB)

( * ) Notice: Subject to any disclaimer, the term of this patent is extended or adjusted under 35 U.S.C. 154(b) by 834 days.

(21) Appl. No.: 11/514,782

(22) Filed: Sep. 1, 2006

(65) Prior Publication Data

US 2007/0140361 A1  Jun. 21, 2007

(30) Foreign Application Priority Data

Sep. 3, 2005  (GB)  ............................ 0517932.0

(51) Int. Cl.
*H04L 7/00* (2006.01)
(52) U.S. Cl. .................... 375/357; 375/259; 375/316; 375/322; 375/324; 375/326; 375/329; 375/340; 455/67.11; 455/69; 455/522; 370/328; 370/332; 370/333
(58) Field of Classification Search .............. 375/259, 375/316, 322, 324, 326, 329, 340, 357; 455/67.11, 455/69, 522; 370/328, 332, 333
See application file for complete search history.

(56) References Cited

U.S. PATENT DOCUMENTS

| | | | |
|---|---|---|---|
| 6,693,566 B2 * | 2/2004 | Jaffe et al. ..................... 341/50 |
| 6,701,129 B1 * | 3/2004 | Hashem et al. ............ 455/67.11 |
| 6,760,077 B2 * | 7/2004 | Choi et al. .................... 348/614 |
| 6,765,623 B1 * | 7/2004 | Parker ........................ 348/607 |
| 6,898,755 B1 * | 5/2005 | Hou ............................ 714/784 |
| 7,142,609 B2 * | 11/2006 | Terreault et al. ............. 375/261 |
| 7,649,868 B2 * | 1/2010 | Heath et al. .................. 370/332 |
| 2004/0203392 A1 * | 10/2004 | Hsu et al. ...................... 455/62 |
| 2005/0162886 A1 * | 7/2005 | Jeong et al. .................... 365/63 |
| 2005/0226161 A1 * | 10/2005 | Jaworski ...................... 370/241 |
| 2008/0211918 A1 * | 9/2008 | Balz ............................ 348/192 |

\* cited by examiner

*Primary Examiner*—David C Payne
*Assistant Examiner*—Leon Flores
(74) *Attorney, Agent, or Firm*—Head, Johnson & Kachigian, P.C.

(57) ABSTRACT

The invention relates to a method and system for use in assessing the quality and integrity of a data transmission path or link between a data transmitting location and at least one receiving location at which a broadcast data receiver is located with means to allow an error rate calculation to be made with respect to a known data signal sequence which is inserted into the transmitted signal. On the basis of the calculations made and sent to the transmitting location a particular data modulation scheme is adopted to provide the most efficient data transmission method for each receiving location. The invention is of particular use in cable data transmission networks of the type which for example allow television channels and other services to be provided to a plurality of receiving locations.

19 Claims, 15 Drawing Sheets

Figure 1a   Figure 1b   Figure 1c   Figure 1d
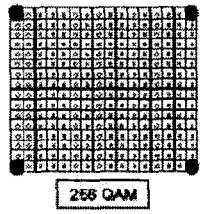
256 QAM
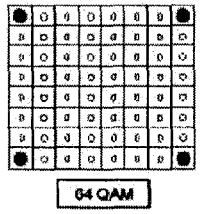
64 QAM
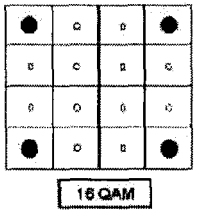
16 QAM
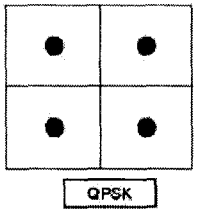
QPSK
Figure 2
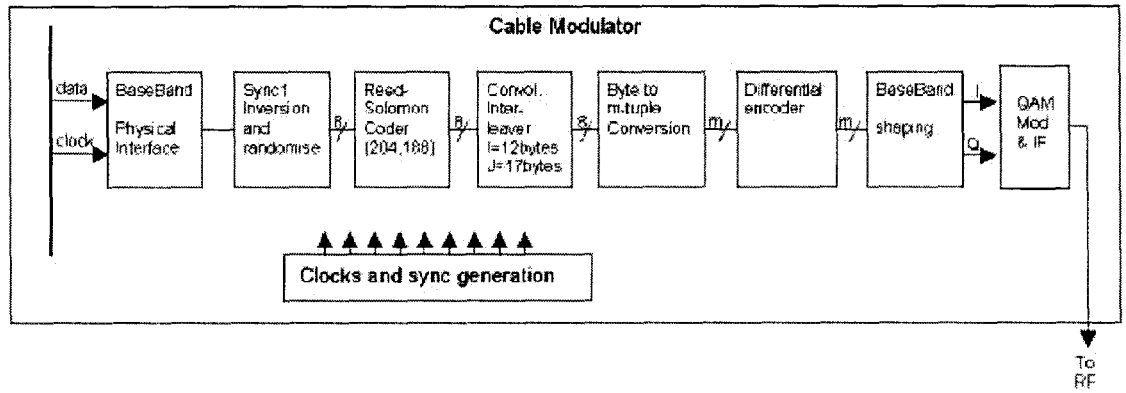
Figure 3
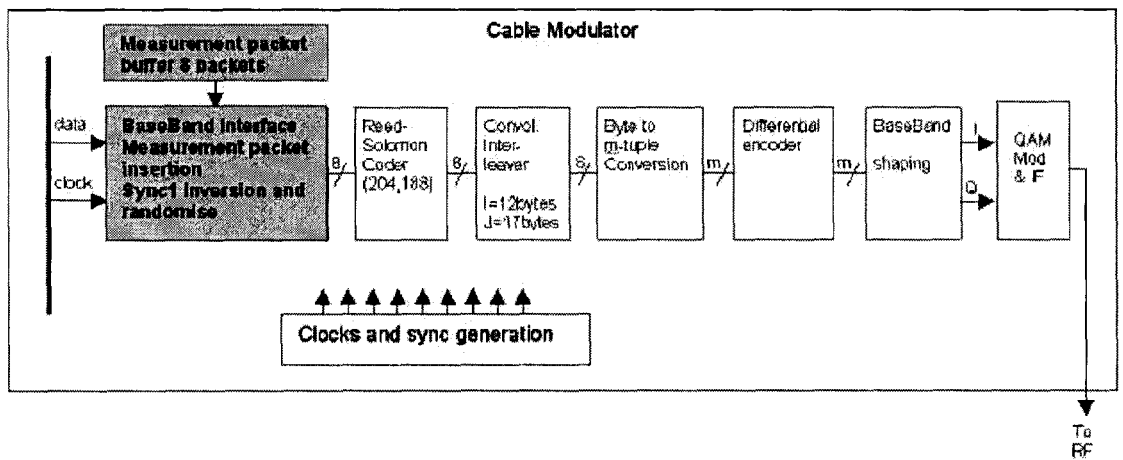

Figure 4

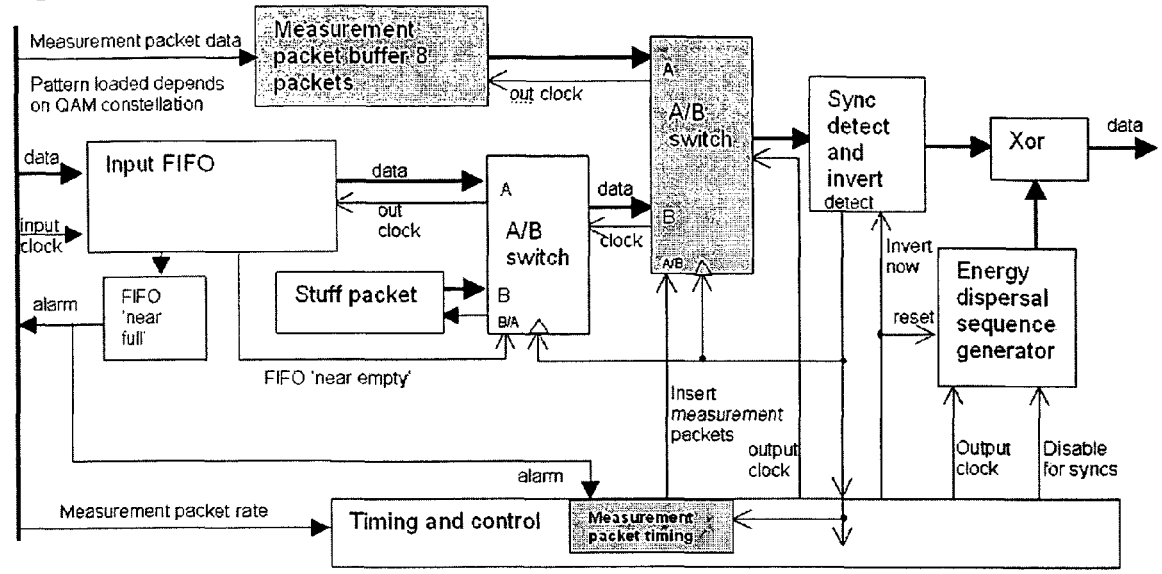

Figure 5

| | 1 | 2 | 3 | 4 | 5 | 6 | 7 | 8 |
|---|---|---|---|---|---|---|---|---|
| 1 | | | | | | | | N SYNC |
| 2 | head | head | head | head | head | head | head | head |
| 3 | head | head | head | head | head | head | head | head |
| 4 | head | head | head | head | head | head | head | head |
| 5 | pointer 182 | pointer 182 | pointer 182 | pointer 182 | pointer 182 | pointer 182 | pointer 182 | pointer 182 |
| 6 | flags/private data | flags/private data | flags/private data | flags/private data | flags/private data | flags/private data | flags/private data | flags/private data |
| 7 | payload | MER | payload | payload | payload | payload | payload | payload |
| 8 | MER | payload | payload | payload | payload | payload | payload | payload |
| 9 | payload | payload | payload | payload | payload | payload | payload | payload |
| 10 | payload | payload | payload | payload | payload | payload | payload | payload |
| 11 | payload | payload | payload | payload | payload | payload | payload | payload |
| 12 | payload | payload | payload | payload | payload | payload | payload | payload |
| 13 | payload | payload | payload | payload | payload | payload | payload | MER |
| 14 | payload | payload | payload | payload | payload | payload | MER | payload |
| 15 | payload | payload | payload | payload | payload | MER | payload | payload |
| 16 | payload | payload | payload | payload | MER | payload | payload | payload |
| 17 | payload | payload | payload | MER | payload | payload | payload | payload |
| 18 | payload | payload | MER | payload | payload | payload | payload | payload |
| 19 | payload | MER | payload | payload | payload | payload | payload | payload |
| 20 | MER | payload | payload | payload | payload | payload | payload | payload |
| 21 | payload | payload | payload | payload | payload | payload | payload | payload |
| 22 | payload | payload | payload | payload | payload | payload | payload | payload |
| 23 | payload | payload | payload | payload | payload | payload | payload | payload |
| 24 | payload | payload | payload | payload | payload | payload | payload | payload |
| 25 | payload | payload | payload | payload | payload | payload | payload | MER |
| 26 | payload | payload | payload | payload | payload | payload | MER | payload |
| 27 | payload | payload | payload | payload | payload | MER | payload | payload |
| 28 | payload | payload | payload | payload | MER | payload | payload | payload |
| 29 | payload | payload | payload | MER | payload | payload | payload | payload |
| 30 | payload | payload | MER | payload | payload | payload | payload | payload |
| 31 | payload | MER | payload | payload | payload | payload | payload | payload |
| 32 | MER | payload | payload | payload | payload | payload | payload | payload |
| 33 | payload | payload | payload | payload | payload | payload | payload | payload |
| 34 | payload | payload | payload | payload | payload | payload | payload | payload |
| 35 | payload | payload | payload | payload | payload | payload | payload | payload |
| 36 | payload | payload | payload | payload | payload | payload | payload | payload |
| 37 | payload | payload | payload | payload | payload | payload | payload | MER |
| 38 | payload | payload | payload | payload | payload | payload | MER | payload |

Figure 6

| row | 1 | 2 | 3 | 4 | 5 | 6 | 7 | 8 | 9 | 10 | 11 | 12 |
|---|---|---|---|---|---|---|---|---|---|---|---|---|
| | | | | MER bytes table , (columns) | | | | | | | | |
| 1 | header | header | header | header | header | header | Byte(2,7) | Byte(1,8) | o | o | o | o |
| 2 | Byte(8,13) | Byte(7,14) | Byte(6,15) | Byte(5,16) | Byte(4,17) | Byte(3,18) | Byte(2,19) | Byte(1,20) | o | o | o | o |
| 3 | Byte(8,25) | Byte(7,26) | Byte(6,27) | Byte(5,28) | Byte(4,29) | Byte(3,30) | Byte(2,31) | Byte(1,32) | o | o | o | o |
| 4 | Byte(8,37) | Byte(7,38) | Byte(6,39) | Byte(5,40) | Byte(4,41) | Byte(3,42) | Byte(2,43) | Byte(1,44) | o | o | o | o |
| 5 | Byte(8,49) | Byte(7,50) | Byte(6,51) | Byte(5,52) | Byte(4,53) | Byte(3,54) | Byte(2,55) | Byte(1,56) | o | o | o | o |
| 6 | Byte(8,61) | Byte(7,62) | Byte(6,63) | Byte(5,64) | Byte(4,65) | Byte(3,66) | Byte(2,76) | Byte(1,68) | o | o | o | o |
| 7 | Byte(8,73) | Byte(7,74) | Byte(6,75) | Byte(5,76) | Byte(4,77) | Byte(3,78) | Byte(2,79) | Byte(1,80) | o | o | o | o |
| 8 | Byte(8,85) | Byte(7,86) | Byte(6,87) | Byte(5,88) | Byte(4,89) | Byte(3,90) | Byte(2,91) | Byte(1,92) | o | o | o | o |
| 9 | Byte(8,97) | Byte(7,98) | Byte(6,99) | Byte(5,100) | Byte(4,101) | Byte(3,102) | Byte(2,103) | Byte(1,104) | o | o | o | o |
| 10 | Byte(8,109) | Byte(7,110) | Byte(6,111) | Byte(5,112) | Byte(4,113) | Byte(3,114) | Byte(2,115) | Byte(1,116) | o | o | o | o |
| 11 | Byte(8,121) | Byte(7,122) | Byte(6,123) | Byte(5,124) | Byte(4,125) | Byte(3,126) | Byte(2,127) | Byte(1,128) | o | o | o | o |
| 12 | Byte(8,133) | Byte(7,134) | Byte(6,135) | Byte(5,136) | Byte(4,137) | Byte(3,138) | Byte(2,139) | Byte(1,140) | o | o | o | o |
| 13 | Byte(8,145) | Byte(7,146) | Byte(6,147) | Byte(5,148) | Byte(4,149) | Byte(3,150) | Byte(2,151) | Byte(1,152) | o | o | o | o |
| 14 | Byte(8,157) | Byte(7,158) | Byte(6,159) | Byte(5,160) | Byte(4,161) | Byte(3,162) | Byte(2,163) | Byte(1,164) | o | o | o | o |
| 15 | Byte(8,169) | Byte(7,170) | Byte(6,171) | Byte(5,172) | Byte(4,173) | Byte(3,174) | Byte(2,175) | Byte(1,176) | o | o | o | o |
| 16 | Byte(8,181) | Byte(7,182) | Byte(6,183) | Byte(5,184) | Byte(4,185) | Byte(3,186) | Byte(2,187) | Byte(1,188) | o | o | o | o |

Figure 7

| RF significant bits | rotation |
|---|---|
| '00' | 0 |
| '01' | $\pi/2$ |
| '10' | $3\pi/2$ |
| '11' | $\pi$ |

Figure 8

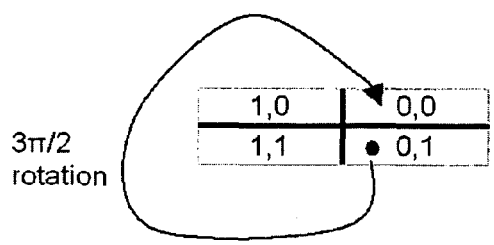

| Nibble | Operation | MSB values |
|---|---|---|
| 1 | Starting at an arbitrary point | 0,1 |
| 2 | Rotate by 3π/2 | 0,0 |
| 3 | Rotate by 0 | 0,0 |
| 4 | Rotate by π | 1,1 |
| 5 | Rotate by 0 | 1,1 |
| 6 | Rotate by π/2 | 1,0 |
| 7 | Rotate by π | 0,1 |
| 8 | Rotate by 3π/2 | 0,0 |

| Modulation scheme | Bit/symbol | Bit rate (inc. FEC) | Reduction of throughput wasting measurement payload | Reduction of throughput using measurement payload |
|---|---|---|---|---|
| 256QAM | 8 | 4.00E+07 | 0.041% | 0.004% |
| 64QAM | 6 | 3.00E+07 | 0.054% | 0.005% |
| 16QAM | 4 | 2.00E+07 | 0.082% | 0.008% |
| QPSK | 2 | 1.00E+07 | 0.163% | 0.016% |

Figure 12

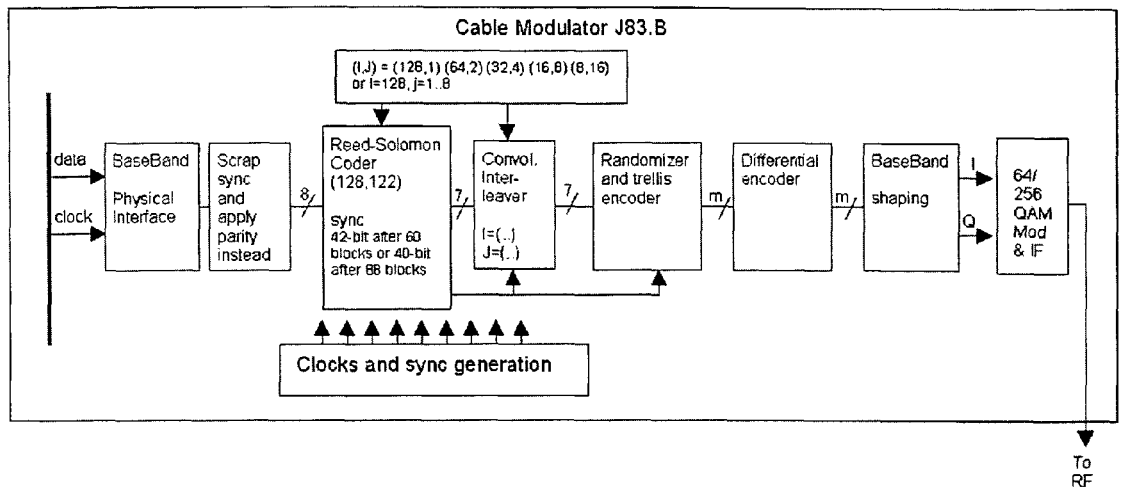

Figure 13

| | Size | Constant identification bit sequence | reserved bits | Sync Frame size |
|---|---|---|---|---|
| J83.Annex B 64QAM | 42 | 28 bit '1110101010110000011011101100' | 10 | 60 packets |
| J83.Annex B 256QAM | 40 | 32 bit '01100011110100000100110111010100' | 4 | 88 packets |

Figure 14

| Maximum measurement sequence insertion rate (fixed MER bytes) | R.S. Sync Frame size (7-bit bytes) | R.S Sync Frame size (input transport bits) | Multiple of Sync Frame size (input transport bits) | Exact number of MPEG transport packets | insertion rate (alignments per second) |
|---|---|---|---|---|---|
| J83.Annex B 64QAM | 60 packets | 51240 | (188x) 9633120 | Yes 6405 | 2.79 |
| J83.Annex B 256QAM | 88 packets | 75152 | (94x) 7064288 | Yes 4697 | 5.47 |

Figure 15

| Maximum measurement sequence insertion rate (variable MER bytes) | R.S. Sync Frame size (7-bit bytes) | R.S Sync Frame size (input transport bits) | Multiple of Sync Frame size (input transport bits) | MER packet refresh rate | insertion rate (alignments per second) |
|---|---|---|---|---|---|
| J83.Annex B 64QAM | 60 packets | 51240 | (47x) 2408280 | 4 per sec (4 fixed MER patterns) | 11.15 |
| J83.Annex B 256QAM | 88 packets | 75152 | (47x) 3532144 | 2 per sec (2 fixed MER patterns) | 10.93 |

Figure 16

| inter-leaver depth | Measurements per sequence |
|---|---|
| 128 | 1 |
| 64 | 3 |
| 32 | 6 |
| 16 | 13 |
| 8 | 26 |

| Current zone | Rotation | Value (l,m) |
|---|---|---|
| Lzone or (Lzone+1) | 0 | -1,-1 |
| (Lzone+2) or (Lzone+3) | π/2 | -1,1 |
| (Lzone+4) or (Lzone+5) | π | 1,1 |
| (Lzone+6) or (Lzone+7) | 3π/2 | 1,-1 |

| Nibble | Operation | MSB values | Value (l,m) | Value (l+m)/2 | Value (l-m)/2 |
|---|---|---|---|---|---|
| 1 | Starting at an arbitrary point | 0,1 | ----- | ----- | ----- |
| 2 | Rotate by 3π/2 | 0,0 | 1,-1 | 0 | 1 |
| 3 | Rotate by 0 | 0,0 | -1,-1 | -1 | 0 |
| 4 | Rotate by π | 1,1 | 1,1 | 1 | 0 |
| 5 | Rotate by 0 | 1,1 | -1,-1 | -1 | 0 |
| 6 | Rotate by π/2 | 1,0 | -1,1 | 0 | -1 |
| 7 | Rotate by π | 0,1 | 1,1 | 1 | 0 |
| 8 | Rotate by 3π/2 | 0,0 | 1,-1 | 0 | 1 |

Encoded impairment
    Receiver Symbol rate approximation 133kHz from signal Symbol rate
    SNR    7.45dB Detected
    4 of the possible measurement symbols Measured
    Receiver Symbol rate approximation 104kHz from signal Symbol rate
    SNR    8.05dB Error in measurements
    Receiver Symbol rate  -29kHz
    SNR    0.6dB Measurement sequence with perfect data (40 random traces)

Measurement point 150kHz Symbol rate miss-alignment with noise added (S/N 9dB) scaled and quantised to 9-bit (40 random traces random phase at start of each measurement sequence)

| | I or Q | I . Q | | 8 | | 3 |
|---|---|---|---|---|---|---|
| no of possible levels | | 1024 | 1048576 | | 7 | 6 | 4 |
| | | 106.6 | 11363.56 | | | | 5 |
| left | | | 1037212.44 | | | | |
| accepted range | (2/8) | | 0.25 | | | | |
| | | | | | | | |
| random probability of accepted | | | 0.247290716 | | | | |
| | | | | | | | |
| length of sequence | | | 8 | | | | |
| choices that have to be correct | | | 7 | | | | |
| | | | | | | | |
| probability of random false detection | | | 5.65529E-05 or 1 in | 17682.57 | | | |
| | | | | | | | |
| symbol rate | | | 5.00E+06 Sym per sec | | | | |
| random false detection rate | | | 282.7643737 per sec | | | | |
| Average time between false detections | | | 3.536513 mili sec | | | | |

| Mode | Count | Time in ms for 5.00E+06 symbols/sec |
|---|---|---|
| 256 QAM | 168 | 0.034 |
| 64 QAM | 224 | 0.045 |
| 16 QAM | 336 | 0.067 |
| QPSK | 672 | 0.134 |

| Probability that detection is all false detection or contains one false detection | Mode | | | |
|---|---|---|---|---|
| Number of measurements detected within count period | QPSK | 16 QAM | 64 QAM | 256 QAM |
| 1 | 65.75% | 65.75% | 65.75% | 65.75% |
| 2 | 9.15% | 4.57% | 3.05% | 2.29% |
| 3 | 7.90% | 3.95% | 2.63% | 1.98% |
| 4 | 7.32% | 3.66% | 2.44% | 1.83% |
| 5 | 6.89% | 3.45% | 2.30% | 1.72% |
| 6 | 6.54% | 3.27% | 2.18% | 1.63% |
| 7 | 6.22% | 3.11% | 2.07% | 1.55% |
| 8 | 5.91% | 2.96% | 1.97% | 1.48% |
| 9 | 5.62% | 2.81% | 1.87% | 1.41% |
| 10 | 5.34% | 2.67% | 1.78% | 1.33% |
| 11 | 5.06% | 2.53% | 1.69% | 1.27% |
| 12 | 4.79% | 2.39% | 1.60% | 1.20% |
| 13 | 4.52% | 2.26% | 1.51% | 1.13% |
| 14 | 4.25% | 2.12% | 1.42% | 1.06% |
| 15 | 3.98% | 1.99% | 1.33% | 1.00% |

| Mode | Timer expired count in symbols | Time in ms for 5.00E+06 symbols/sec stream |
|---|---|---|
| 256 QAM | 168 | 0.034 |
| 64 QAM | 224 | 0.045 |
| 16 QAM | 336 | 0.067 |
| QPSK | 672 | 0.134 |

Figure 34
| Probability that detection is all false detection or contains 3 false detections two of which are rejected by rejecting the min/max | Mode | | | |
|---|---|---|---|---|
| Number of measurements detected within count period | QPSK | 16 QAM | 64 QAM | 256 QAM |
| 1 | 65.75% | 65.75% | 65.75% | 65.75% |
| 2 | 9.15% | 4.57% | 3.05% | 2.29% |
| 3 | 3.12% | 1.56% | 1.04% | 0.78% |
| 4 | 2.71% | 1.35% | 0.90% | 0.68% |
| 5 | 2.46% | 1.23% | 0.82% | 0.61% |
| 6 | 2.27% | 1.14% | 0.76% | 0.57% |
| 7 | 2.12% | 1.06% | 0.71% | 0.53% |
| 8 | 1.99% | 0.99% | 0.66% | 0.50% |
| 9 | 1.87% | 0.93% | 0.62% | 0.47% |
| 10 | 1.76% | 0.88% | 0.59% | 0.44% |
| 11 | 1.65% | 0.82% | 0.55% | 0.41% |
| 12 | 1.55% | 0.77% | 0.52% | 0.39% |
| 13 | 1.44% | 0.72% | 0.48% | 0.36% |
| 14 | 1.43% | 0.72% | 0.48% | 0.36% |
| 15 | 1.42% | 0.71% | 0.47% | 0.36% |
Figure 35
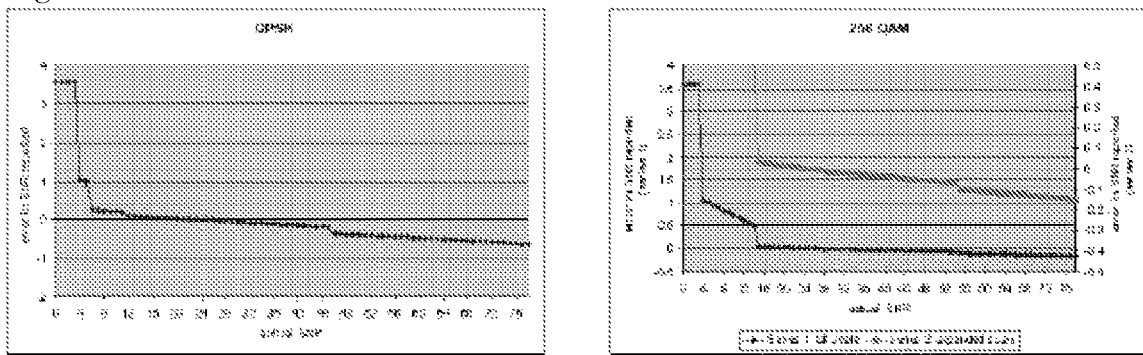
Figure 36
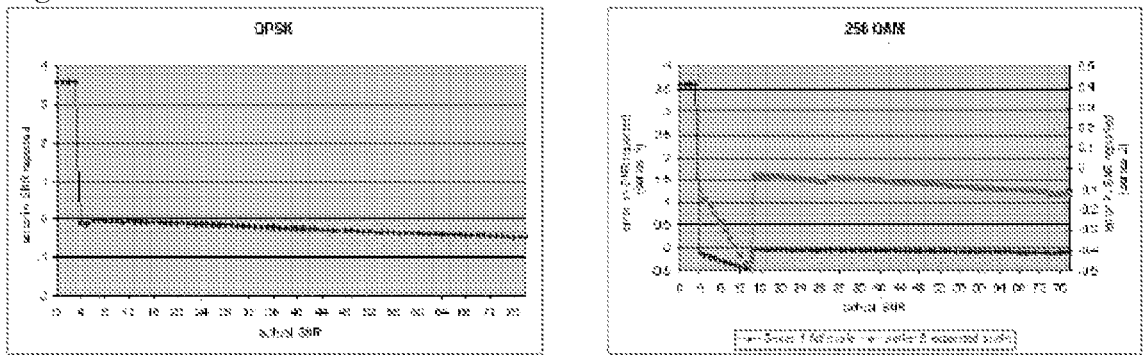

METHOD AND SYSTEM FOR DETECTING TRANSMITTED DATA SIGNAL QUALITY AND INTEGRITY

CROSS-REFERENCES TO RELATED APPLICATIONS

This application claims priority to British Patent Application No. 0517932.0 filed 3 Sep. 2005.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Current methods of testing the quality of data signals and data links between a data transmitter and receiver in systems which allow the transmission of video and audio data to allow the generation of television programs available for selection by subscribers at receiving locations generally requires specialist equipment that is not included within the "normal" broadcast data receiver at the subscriber locations. The present invention relates to a method to allow the quality assessment to occur between a transmitting location and a receiving location at which said broadcast data receiver is provided. One broadcast data standard is the Digital Video Broadcasting (DVB) standard and this specifies forward error correction (FEC) methods to attempt to limit the errors which occur in the data transmission and hence improve the video and audio reproduction at the receiver locations. Over a limited range (around the Quasi-Error Free QEF) the bit error rate (BER) can be used as a means of assessing link quality. However this method is only valid around the QEF point.

For example, considering the DVB C standard that uses the Reed Solomon (188,204) FEC method. Typically, below QEF-2.5 dB the BER no longer gives any link quality information (the FEC cannot lock to the signal) and above QEF+ 2.5 dB a BER measurement takes longer than 1 second for a reliable measurement (e.g. at QEF+5 dB requires over 25 seconds for a reliable BER measurement). Thus to measure Link Quality outside a narrow range around QEF requires a more practical method.

To assess the link quality outside the range covered by the FEC, to measure the BER it is required to measure either Signal to Noise Ratio (SNR) or Modulation Error Ratio (MER). Both these ratios can be calculated from the demodulated signals raw I and Q samples, prior to symbol de-mapping.

The problem in calculating these ratios is to be able to separate out the noise energy from the signal energy. This can be achieved by either measuring the signal for a 'long time average' or by transmitting a 'known signal' (e.g. a pseudo-random number sequence with known generating function).

The 'long time average' method separates the signal from the noise by averaging out the noise component of the signal. This is fairly trivial for QPSK signals but requires an increasing number of samples and is increasingly computationally demanding with higher modulation modes (increasing with number of bits per symbol). If the demodulator is unlocked and the number of bits per symbol is not known, then it is not possible to determine the difference between noise and data at a higher modulation mode.

BRIEF SUMMARY OF THE INVENTION

The aim of the invention is to provide a means of providing an improved method of quality assessment of data transmission and reception.

In a first aspect of the invention there is provided a method of assessing the quality of data signals which are transmitted from a transmitter location and at least one data receiving location, the method including the steps of identifying a known signal data sequence, inserting the known signal data sequence into the transmitted signal or stream of data and wherein a broadcast data receiver at the at least one receiving location includes detection means to detect whether the known signal data sequence is present or not in the received signal at the receiving location.

In a particular embodiment, there is provided a method there is provided a method of characterizing the signal integrity of a transmission path between two locations of a network, even where symbol lock cannot be achieved, the method includes the steps of inserting at the data transmitter a specific sequence of known data values, inserting the sequence of known data values into a specific part of the transmission stream to generate a specific sequence of marker symbols to be transmitted at a known frequency and at the receiver tuning a tuner to the known frequency to receive the signal.

Typically, the method includes the further step of using a signal sampler, sampling at a rate based on prior knowledge, related to the symbol rate but not necessarily equal to the symbol rate, approximations of the symbols and a correlator generating a correlation between the known marker symbol values and the symbol approximations.

Typically, a threshold is set above which the correlation is determined to represent a match of respective correlated signals and an MER (Modulation Error Ratio) is calculated using the sampled marker data sequence and the ideal representation of the marker symbol sequence when the threshold is attained, to provide an indication of signal integrity for the transmission path between the transmitter and receiver locations.

In one embodiment, the method includes the means to discriminate between false and/or random correlations. The method includes the additional steps of inserting the data set at fixed regular intervals, checking the interval between the matches to see if they are coincident and rejecting matches outside this interval, and then performing the MER calculation.

In a further embodiment the method for discrimination between false and/or random correlations comprises collecting a set of MERs from the matches such that they can be averaged, or otherwise processed, to remove the effect of false matches by the correlator.

In a further aspect of the invention, there is provided a system for the transmission of data between a transmitting location and at least one receiving location. A broadcast data receiver is at the receiving location with calculating means to calculate an MER value from a known data signal sequence received as part of the transmitted data signal. The calculated values are returned from the broadcast data receiver to the transmitting location via a return path channel.

In the system the receivers calculate an MER value from the received signal and return the calculated values to the transmitter via a return path channel. The transmitter can then use the MER values to select from a table one of a range of modulation schemes, the selection based with respect to the quality of the link in order to maximize spectral efficiency while maintaining a reliable symbol lock at all receivers.

Typically, the selected modulation scheme is communicated to the transmitter and the selected modulation scheme used for subsequent transmissions unless the link quality changes.

Preferably, the data transmission link is thereafter monitored to ascertain whether further changes in the modulation scheme are beneficial. This system of adaptively selecting the modulation scheme allows the maximum data carrying capacity of the link to be attained.

The method and system in accordance with the present invention have the benefits of being compatible with current standards, have a low impact on data throughput, can be operated regardless of whether the receiver is locked. SNR/MER measurements between 4 and >60 dB can be achieved regardless of the number of bits per symbol and the same detection method and measuring system can be used regardless of the number of bits per symbol. The circuits required to support the method and system could be included in ASIC demodulator Ics.

BRIEF DESCRIPTION OF THE SEVERAL VIEWS OF THE DRAWINGS

FIGS. 1a-1d show modulated IQ constellations of the present invention.

FIG. 2 is a block diagram of a cable data transmission system.

FIG. 3 is a block diagram showing a measurement packet insertion interface as added by the present invention.

FIG. 4 is a block diagram showing detail changes that are required to enable the measurement packet insertion of the present invention.

FIG. 5 is a table containing the first 38 bytes of each of the 8 packets containing a measurement sequence designed to work with the standard J83.annex A.

FIG. 6 is a RF domain table.

FIG. 7 is a table showing the RF significant bits and rotation.

FIG. 8 shows encoding of sequences.

FIG. 12 is a block diagram showing the use of complex standards.

FIG. 13 is a table showing the steps of using a synchronization frame.

FIG. 14 is a table showing measurement rate.

FIG. 15 is a table showing measurement rate increased.

FIG. 16 is a table showing a number of varying measurements.

FIG. 34 shows a probability that false data still remains within averaged values.

FIG. 35 shows the effect of the few remaining false detections on the overall measurement accuracy.

FIG. 36 shows the improvement effect of feeding measured results from all measurement packet insertions into a moving average filter and limiting the rate of change of the filter to 3 dB per update.

DETAILED DESCRIPTION OF THE INVENTION

Figures 9, 10, 11:
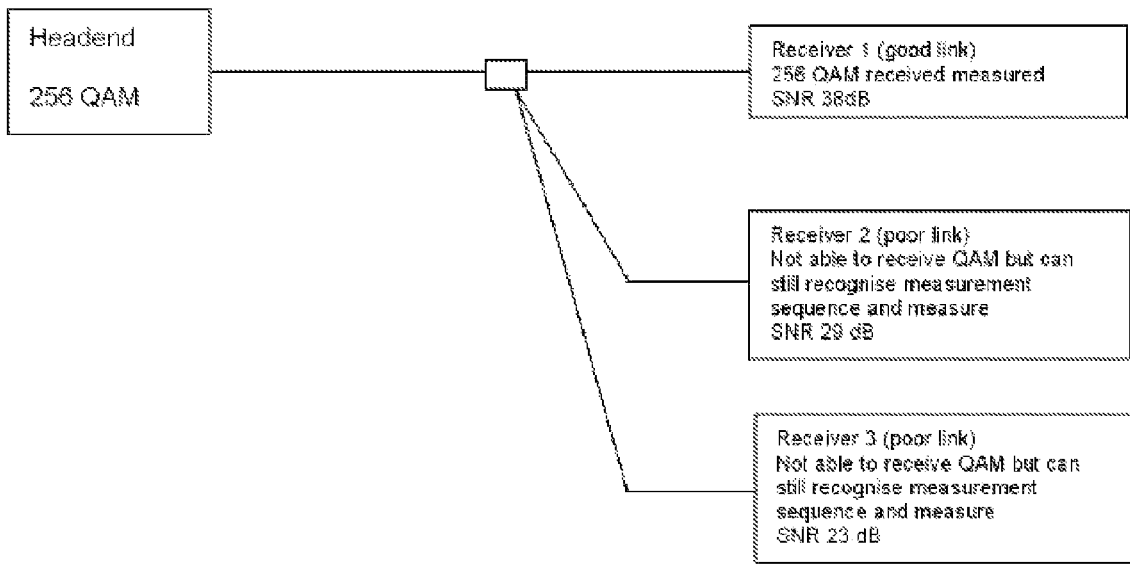
FIG. 9 is a table showing how to encode a measurement sequence.
FIG. 10 is a table showing a reduction of data throughput.
FIG. 11 is a block diagram showing plans of usage of different receivers.

Using QAM modulation schemes which are differentially coded a sequence of 8 symbols guarantees a sequence of seven known phase changes and in this embodiment of the invention the method results in a fixed sequence of 8 symbols in the modulated output regardless of the modulation mode or coding used. To maximize the signal content and hence the accuracy of the measurement, the symbols chosen correspond to the outer or corner points of the modulated IQ constellation as illustrated in FIGS. 1a-d.

Correlation between the known phase change sequence and the received I.Q signal is used in the broadcast data receiver to detect the measurement sequence. Detection of the measurement sequence latches the IQ values for later computation of SNR/MER.

When the broadcast data receiver is not locked to the input signal then, in addition to designed phase change between measurement symbols, there will be an additional phase change corresponding to the difference between the signal and receiver symbol rates. As long as the additional phase change is less than $\pi/16$ per symbol measurement, symbol sequences will still be recognized.

FIG. 2 shows a block diagram of a cable data transmission system Modulator of the type specified in the DVB J83.annex A standard.

The data arriving at the physical interface is buffered and read out at a constant rate appropriate to the modulation mode chosen. If the buffer is empty then when an output is required a stuffing packet (PID=& 1FFF) is inserted. If the buffer becomes more than 75% full, an alarm is sent to the DVB stream multiplexer (not shown) to reduce the data rate arriving at the buffer.

The invention adds a measurement packet insertion interface to the physical interface as shown in the FIG. 3. The insertion of a block of 8 measurement packets is synchronized with the Sync1 inversion so that measurement packet 1 always corresponds to the first packet with non-inverted sync; measurement packet 2 always corresponds to the second packet with non-inverted sync and measurement packet 8 corresponds to the inverted sync as shown in FIG. 5.

At each inverted sync the pseudo-random generator within the randomizer is re-loaded with its seed value. Thus, the effect of the randomizer on data held within the measurement packet buffer is always deterministic.

FIG. 4 shows detail of the changes required to enable the measurement packet insertion with the added new functions shaded. Input data is buffered in the 'input FIFO'. If the FIFO becomes over full, an alarm condition is set to instruct the equipment feeding data to the modulator to reduce the data arrival rate.

If the FIFO nears the empty condition, then the FIFO 'near empty' output becomes true and the A/B switch is requested to swap to insert stuffing packets. The A/B switches do not change state until a detected sync latches the change at the 'A/B' control input. This ensures that the switches only change state at packet boundaries.

While stuffing packets are being inserted, no data is being clocked out of the 'input FIFO' allowing it to fill a point where it is no longer in the 'near empty' condition, and the A/B switch is requested to resume passing input FIFO data. Again, the state change of the switch does not occur until the next packet boundary.

In a similar way to the insertion of stuffing packets, the new (shaded) A/B switch allows the insertion of the measurement packet sequence. While the measurement packet sequence is being inserted, no data is clocked out of the 'input FIFO', and switch state changes occur at packet boundaries.

The 'measurement packet timing' block is responsible for deciding when to insert the 8 packet measurement sequence, including the required synchronization with the negative sync insertion that synchronises normal 8 packet energy dispersal function.

The 'measurement packet timing' block will attempt to match the requested measurement packet insertion rate. Once a measurement sequence is started, all 8 measurement packets will be inserted before data flow is returned to the output of the 'input FIFO'. However, a new measurement sequence will not be inserted if the 'input FIFO' is in the alarm state.

The measurement packet buffer is different from the 'input FIFO' in that when data is read from the measurement packet buffer it is still retained within the buffer. This means that every measurement sequence is the same as the last measurement sequence unless the measurement packet buffer is overwritten from the control bus.

Normally, the measurement packet buffer will only be overwritten when the settings within the modulator are changed (e.g. when changing modulation mode from 256QAM to 64QAM). However, only a few bytes within the measurement packet are required to generate the required measurement symbol sequence within the RF domain. The remaining bytes (hereafter referred to as 'measurement payload' bytes) can be used to deliver data that changes at a relatively slow rate to the normal transport stream (e.g. upstream and downstream channel allocations).

FIG. 5 is a table that contains the first 38 bytes of each of the 8 packets containing a measurement sequence designed to work with the standard J83.annex A.

The first byte (byte 1) of each packet contains a sync byte &47 Hex with the 8th packet containing the &BB Hex inverted sync.

The next 3 bytes (byte 2,3,4) contain the normal transport packet header including PID and contents Flags. The PID can be set to any allowed value and the value chosen signaled in the DVB SI tables in the normal way. Any PID can be used and the choice of PID does not matter to the link quality measurement. However, it may be desirable to adopt a value defined within the SI tables to enable the 'measurement payload' bytes to be used to convey useful information.

The packet header bytes must also convey that the rest of the packet is filled with adaptation field only (i.e no elemental stream data) and that the adaptation field contains private data. Setting the flags in this way ensures that if required, the 'measurement payload' bytes are obtainable. Declaring the whole packet as being both adaptation field and private data means that in the presence of link impairments causing non-correctable bit errors, it is extremely unlikely that the data within the measurement packets will be interpreted as being for a purpose other than that intended.

The next two bytes (bytes 5 and 6) contain the adaptation field length pointer and flags indicating private data. The remaining bytes (7 . . . 188) contain the 'measurement payload' bytes and 'MER' bytes. Note each packet will be extended to 204 bytes by parity information from the reed Solomon encoder before being transmitted.

The 'MER' bytes contain the data that will form the required measurement RF symbol sequence. Each diagonal stripe of 'MER' Packets contain data that will make up one RF symbol sequence. This stripe pattern of data is determined by the convolutional interleaver, only one pattern of many possible patterns is shown here to illustrate the principle.

Defining byte (X,Y) to be the Xth byte within packet Y to describe the sequence of bytes as they are transmitted.

Packets are read from the measurement packet buffer in strict numerical order.

The first packet: Byte (1,1) . . . to . . . byte (188,1)

followed by the second packet: Byte (1,2) . . . to . . . byte (188,2)

followed by the third packet: Byte (1,3) . . . to . . . byte (188.3)

. . .

. . .

. . . followed by the final packet: Byte (1.8) . . . to . . . byte (188.8)

However, these bytes will be re-ordered by the convolutional inter-leaver and will appear in the RF domain in the sequence described in FIG. 6.

Defining indices to the table as entry (row, column) then the packet order output from the convolutional inter-leaver and hence the RF symbol sequence will be Entry (1, 1) entry (1,2), entry (1,3) . . . entry (1,12), entry (2,1) . . . entry (2,12), entry (3,1) . . . entry (16,12).

The entries 'O' in the table of FIG. 6 are from packets other than the measurement packet sequence.

There are at least 15 full RF measurement symbol sequences shown in the table above. If a receiver has both carrier and symbol lock to the RF signal then it will see all 15 RF measurement symbol sequences per measurement packet sequence.

If a receiver is not in lock, then the number of RF measurement symbol sequences seen per measurement packet sequence seen will depend on the difference between the receivers free running symbol clock and the actual symbol rate.

For downstream cable channels the symbol rate is above 5 Msymbol/s. At this rate receivers whose free running symbol clock is within ±150 KHz of the actual symbol rate will see on average two of the potential all 15 measurement sequences per measurement packet sequence. This is well within the capabilities of modern crystal based tuning systems. Two recognized measurement sequences is sufficient to measure the SNR or MER to within ±3 dB over a wide range. In addition it will be possible to calculate a tuning step to bring the error between the free running symbol clock and the actual symbol rate to within ±10 KHz.

For downstream cable channels the symbol rate is above 5 Msymbol/s. At this rate receivers whose free running symbol clock is within ±10 KHz of the actual symbol rate see on average 6 of the potential all 15 measurement sequences per measurement packet sequence. This is sufficient to measure the SNR or MER to within ±1 dB over a wide range (typically 3 to 60 dB).

Further accuracy can be obtained by averaging over several measurement packet sequences.

It is the convolutional inter-leaver that defines which of the bytes within the measurement packet sequence will be used to define the RF measurement symbol sequence and, hence, become MER bytes. However, it is the energy dispersal function and QAM constellation mapping scheme which determines what bits need to be placed within these bytes.

A preferred way to calculate the necessary bits is to break the calculation down into simple stages. Firstly the value of the energy dispersal function corresponding to each of the MER byte positions within this measurement packets structure is calculated, and stored within the corresponding MER byte. This is a trivial calculation since both the measurement packet sequence and energy dispersal function are synchronized to the eight-packet cycle. If no other calculation is performed, then the output of any MER bytes combined (Xor) with the energy dispersal function equals &00 Hex.

Next, the MER bytes corresponding to rows 2 to 16 of the table above are assembled into 15 off 64 bit words. Each 64 bit word is then divided into n-bit nibbles corresponding to the modulation scheme used (e.g. 8-bit nibbles for 256QAM, 7-bit nibbles for 128QAM 6-bit nibbles for 64QAM, 5-bit nibbles for 32QAM, 4-bit nibbles for 16QAM, 2-bit nibbles for QPSK).

The two most significant bits of each nibble will be coded with values so that a specific RF 1Q bit pattern will result when the symbols are differentially coded.

The remaining least significant bits (LSBs) of each nibble can be X or combined with the least significant bits required to get maximum signal amplitude in any quadrant (e.g. '111100' 256QAM, '11100' BIN for 128QAM, '1100' BIN for 64QAM, '111' BIN nibbles for 32QAM, '11' BIN for 16QAM, no LSBs for QPSK). Note exact values will depend on the multiple mapping defined in the modulators current active mode.

Differential encoding will result in a most significant RF bit pattern depending on a rotation from the previous symbol as indicated in FIG. 7.

For example to encode the designed seven sequence RF detection pattern ('10', '00', '11', '00', '01', '11', '10') or (3 $\pi/2$, 0, $\pi$, 0, $\pi/2$, $\pi$, 3 $\pi/2$)

Eight symbols before differential encoding are required to guarantee seven known symbol rotations after encoding.

Using the quadrant definition in FIG. 8 the table provided in FIG. 9 shows how to encode the measurement sequence (3 $\pi/2$, 0, $\pi$, 0, $\pi/2$, $\pi$, 3 $\pi/2$)

Then the two most significant bits of each nibble can be Xor combined in turn with the encoded measurement sequence to generate the measurement symbol bit pattern. This pattern is repeated every 8 nibbles, but nibble 1 above always corresponds to a start of 'MER bytes table' row.

All of the nibbles can then be re-assembled into the 15 off 64 bit words corresponding to the rows 2 to 16 of the 'MER' bytes table', then loaded into the respective MER byte positions within the measurement packet sequence.

This completes the measurement packet sequence definition.

FIG. 10 shows the reduction in data throughput for ten measurement packet sequences per second at a receive symbol rate of 5 Msymbol/s.

Even at the lowest data rates (QPSK) the ability to provide continual link quality monitoring at a refresh rate of ten times per second costs less than two thousandths of the throughput data rate. At this refresh rate the measurement payload is equivalent to approximately 13 Kbit/s If one channel in 16 carries measurement packets, then the total burden on the network will be less one thousandth of a percent of the network capacity, yet this will enable the receiver to build up a qualitative link budget assessment across all channels within 5 seconds (Assumption: 250 ms per tune, 250 ms measurement time (i.e at least 2 measurement packet sequences).

The link budgets measured at different receivers can be used to plan where to place services during the migration of a network from full broadcast, to a combined broadcast and point to point network.

An example of this ability is illustrated in FIG. 11. Three receivers are connected to a cable headend. Consider two channels A and B; Channel A (low frequency) can be received by any receiver on the network and as such is fully occupier with data communications. Channel A retains a small amount of free capacity that is sufficient for receivers to register with the headend but not enough capacity for normal network access data rates. Channel B (high frequency) can only be received at some places on the network due to the higher cable losses at higher frequencies. Channel B has spare capacity.

The headend is sending data to receiver 1 using a 256QAM carrier on channel B. During this transmission receivers 2 and 3 come on line and register with the headend using channel A, and request data transmission. During registration receivers 2 and 3 are instructed to measure the SNR they can achieve on channel B. Neither receiver can lock to the 256QAM carrier on channel B due to longer path loss at the higher frequency of channel B. Because the headend is inserting measurement packets into channel B, both receivers can report to the SNR that they can achieve.

In the example shown in FIG. 11, the headend has, without disturbing the communications on channel B, discovered information about the link quality to receivers 2 and 3.

Assuming the reported values illustrated in FIG. 11 the headend now knows that if it wishes to send data to receiver 2 using channel B it must first change the modulation scheme to 64QAM but to send data to receiver 3 it must change the modulation scheme to 16QAM.

The headend can now decide if there will be sufficient channel capacity to support all three receivers 1,2,3 on channel B using 16QAM.

If it is decided to switch to 16QAM, then the headend also knows that as soon as another channel becomes available, it should move receiver 3 to the new channel. Doing this will increase the channel capacity on channel B by an amount equal to the change from 16QAM to 64QAM, as well as freeing the capacity previously used by receiver 3.

By measuring the Link quality of all links using the measurement packet insertion method in accordance with the invention, on a switched bandwidth data transmission network it is possible to:

1. Optimize the network for maximum bandwidth

2. Prioritize which client receivers to move first to optimize the network for maximum bandwidth, as clients join or leave the network.

The detailed description of the above embodiment applies very easily to standards like DVB J83 ANNEX A and C where the Reed Solomon FEC convolutional inter-leaver, and energy dispersal function boundaries frequently coincide with normal transport packet boundaries. With some minor adaptations the same basic principle is applicable to more complex standards like DVB J83 ANNEX B as shown in FIG. 12.

The J83 ANNEX B standard defines modulation schemes for 64QAM and 256QAM. The standard takes as input MPEG transport packets (188 of 8-bit bytes) but uses a FEC framing based on an entirely different structure (122 off 7-bit bytes).

The first level of error correction replaces the normal MPEG transport packet sync byte with a parity byte. The parity checking system employs a syndrome generator and parity check matrix that results in the normal &47 Hex MPEG sync byte in the no error state. This parity scheme does not interfere with the basic packet MPEG transport packet structure. (Protection ratio 0.27%).

The next FEC level is the Reed Solomon (128, 122) layer. This layer breaks the 1504-bit (188 of 8-bit bytes) MPEG packet structure into 854-bit (122 off 7-bit bytes) RS packets. To each RS packet, 6 RS parity packets (42-bits) are added, allowing up to 21-bit errors to be corrected anywhere within the packet. This is an error protection ratio of 2.46%, i.e the 21 correctable bit errors represent 2.46% of the total packet size. Combined, the first level and second level of parity checking correction, give an overall protection ratio of 2.72%. This compares with 4.26% protection ratio provided by the annex A Reed Solomon (204, 188) scheme. The trellis encoding provides the remainder of the Annex B FEC protection.

New synchronization bits must be inserted to the 128 byte (7-bit byte) packet sequence output from the annex B Reed Solomon encoder. This is because all of the synchronization information within the MPEG transport packet structure has been replaced with parity information. Attempting to decode the encoded bit stream it would be very difficult to find the 128-byte packet boundaries without additional synchronization bits.

The J83.B standard adds a synchronization bit sequence after a block of Reed Solomon encoded packets. These synchronization bits contain a fixed identification bit sequence, a 4-bit control word, and a number of reserved bits (usually set to zero). The 4-bit control word contains bits representing the convolutional inter-leaver setting as shown in FIG. 13.

The Reed Solomon synchronization frame is also used to synchronize the convolutional inter-lever, randomizer and trellis encoder.

It is the synchronization frame that allows the same measurement packet sequence insertion method used for Annex A to be used (with minor adoptions) for Annex B.

With Annex A the alignment is simple and the 8 MPEG transport sized measurement packets can be inserted at any MPEG Nsync boundary. A fixed pattern of MER bits will lead to a deterministic IQ phase change sequence at a maximum possible insertion rate of approximate 26,000 times a second (256QAM). Hence we can choose almost any sensible insertion rate.

The complex alignment of annex B means that insertion of a measurement packet sequence at the MPEG transport packet level will only lead to a deterministic IQ phase change sequence at a maximum rate indicated in FIG. 14 if the MER bits are a fixed pattern. This represents a usable link quality measurement refresh rate. The rate can be increased easily by updating the MER pattern as illustrated in FIG. 15.

Since 47 is prime FIG. 15 represents the maximum measurement rate using a fixed positions of MER bytes within the measurement 8 packet sequence.

The pattern of MER byte positions within the measurement packet sequence resulting in the required sequence of measurement symbol phase changes in the RF IQ domain, will be different for each setting to the inter-leaver depth, and different from that used for annex A.

The number of measurements that can be made per measurement packet sequence also varies with inter-leaver depth as described in FIG. 16.

The bits to load into the MER bytes can be calculated in a similar manner to the method described for annex A above, with the added complexity of including the trellis 19/20 QAM encoding and symbol mapping.

Although the FEC frame boundary will align with the MPEG transport packet start every 188 FEC frames, there is no method of determining which of the 188 frames is in alignment. This has to be determined by inserting measurement packets and detecting if the alignment is correct at the output of the reed Solomon decoder (or at any convenient point in the encoder chain after the Reed Solomon decoder). This gives a worst case time to align with the FEC frame boundary of 67 seconds (188 trials at 2.76 trial/s).

Frame alignment will be required at power up, or if the modulator is reset. During the Frame alignment phase any measurement packets sent will not produce the required IQ symbol phase sequence and so not be detected by the receivers.

Figure 17:
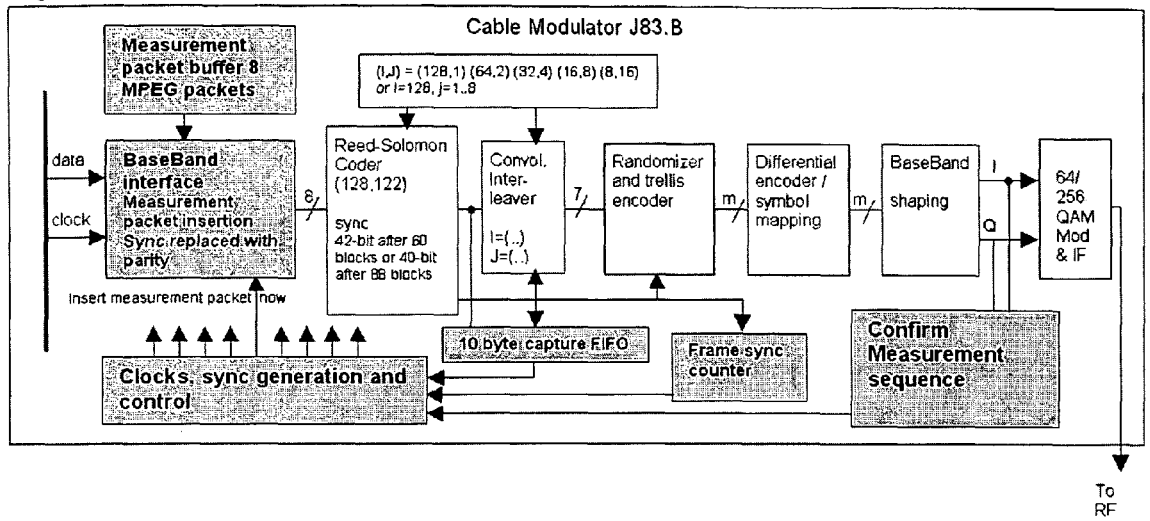
FIG. 17 is a block diagram indicating a modification.

FIG. 17 indicates a modification in which the baseband interface is the same as that for Annex A except that the sync inversion block becomes a sync replacement block. The A/B switch responsible for inserting the measurement packets receives both is control and synchronization from the 'clocks, sync generation and control block'.

The clock, the 'clocks, sync generation and control block' applies an FEC phase offset to the Frame sync counter to generate the measurement insertion synchronization.

The 'Frame sync counter' gives an output every 47 Reed Solomon Frame syncs (approximately 10 times a second).

The '10 byte capture FIFO' captures the first 10 bytes after each 'Reed Solomon Frame sync. The 'control block' reads the capture FIFO output to calculate the required FEC phase offset. The 'control block' carries out a correlation of the output from the capture FIFO with the first 6 bytes of the measurement packet 1 to determine if phase alignment is achieved. If there is no correlation the FEC phase offset is incremental to delay the measurement packet insertion point relative to the 'Frame sync counter' output. This process is continued until correlation is achieved.

Since the calculation of the correct bits to load into the MER byte positions in order to generate the correct IQ measurement phase sequence is more complex in Annex B a measurement confirmation block is included.

The 'Confirm Measurement sequence' block contains the same measurement sequence detector used within the receivers. It provides confirmation the correct IQ measurement phase sequence has been generated. It will generate a confirmation of correct sequence that is delayed from the insertion time of the measurement sequence. The convolutional interleaver settings and other deterministic coding delays determine the delay between inserting the measurement packets and a confirmation being detected.

Figure 18:
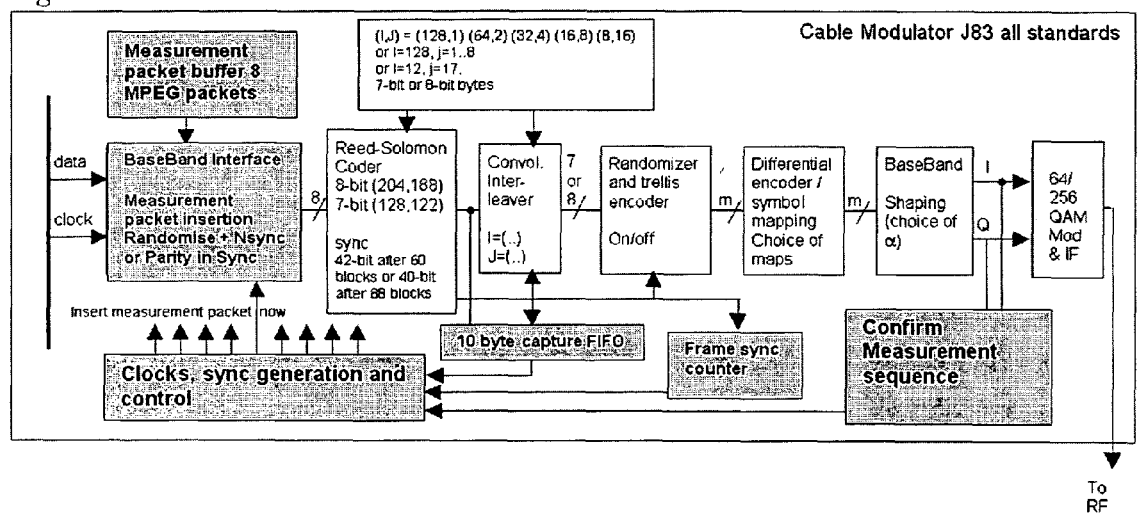
FIG. 18 is a block diagram illustrating a multiple standard modulator.
Figure 19:
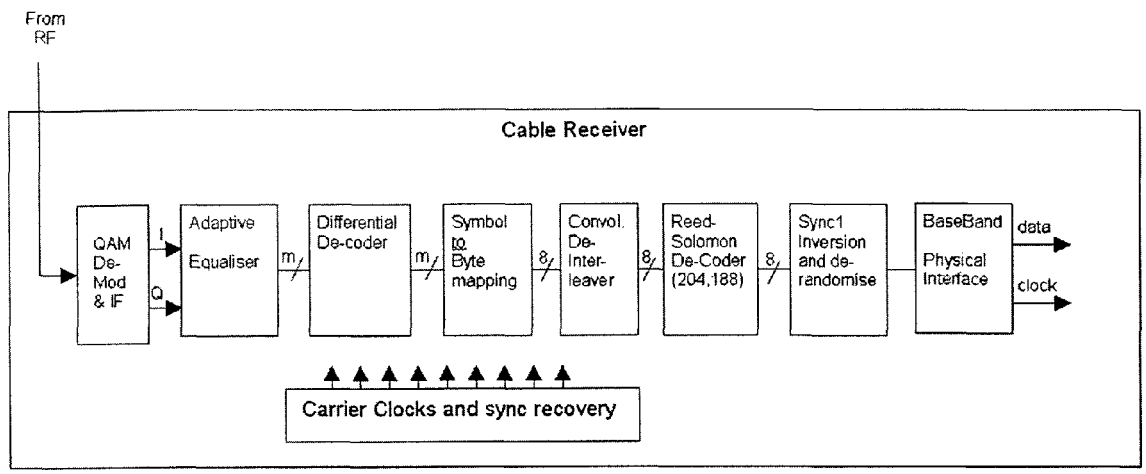
FIG. 19 is a bock diagram illustrating a published J83 Annex A channel decoder.
Figure 20:
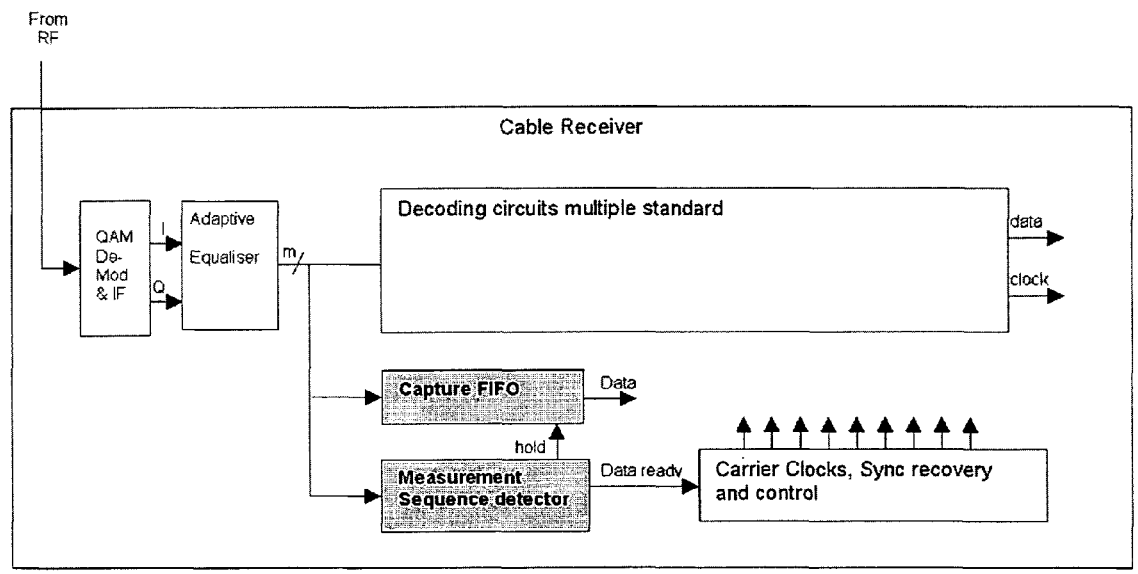
FIG. 20 is a block diagram showing adaptations necessary to include a measurement packet decoder.

FIG. 18 illustrates a multiple standard modulator with measurement packet insertion. FIG. 19 illustrates the published J83 Annex A channel decoder. FIG. 20 shows the adaptations necessary to include the measurement packet decoder. Both new measurement blocks interface to the output of the adaptive equalizer and carrier clocks, sync recovery and control blocks. These new blocks are the same regardless standard being received.

The equalizer outputs samples at the receiver's symbol rate, these symbols are scaled to fill the available bit range by AGC circuits in the RF and IF circuitry (not shown).

If the receiver is locked to the incoming signal then the receiver symbol rate will equal the signal symbol rate exactly, and the equalizer will be converged to optimum values.

If the receiver is not locked to the incoming signal then the receiver symbol rate will be close to the signal symbol rate (accuracy depends on reference crystals within the tuning system), and the equalizer will be set to default values.

The default values could be loaded from a look up table containing several options (e.g. the last set of settings for good lock on this channel).

The capture FIFO stores the measurement symbol sequence for later processing by the controller. The capture FIFO contains several lanes. The symbols from the equalizer are streamed through a lane of the FIFO until a measurement sequence is detected. On detection an interrupt is sent to the controller, the current lane is flagged as full and symbols are streamed through the next available lane. A full lane is emptied and flagged as available again by the controller reading the last byte of the stored symbols.

The 'Measurement Sequence detector' de-rotates the incoming symbols and carries out the necessary correlation function to determine the presence of measurement packets. The system is designed to keep this processing to a minimum.

Figures 21, 22, 23:
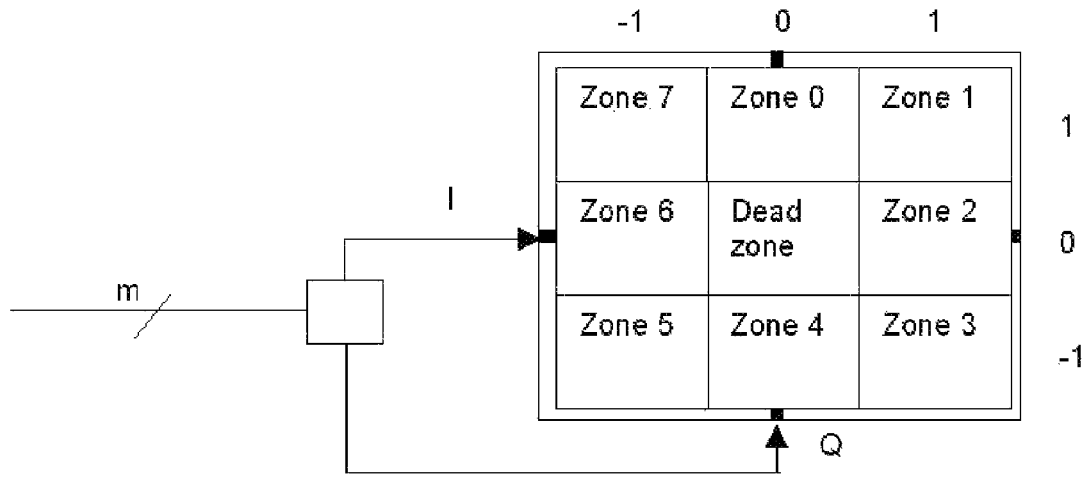
FIG. 21 indicates a measurement sequence detector in which the first phase is symbol de-rotation.
FIG. 22 shows a phase change table relative to last zone 'Lzone'.
FIG. 23 shows an original code sequence.

FIG. 21 indicates a measurement sequence detector in which the first phase is symbol de-rotation.

The m bits from the equalizer represent the IQ vectors of the received symbol. Since measurement symbols consist of the outer corner constellation points only all vectors in the dead zone are not part of the measurement sequence.

The measurement sequence is encoded as a sequence of phase changes which can be decoded using the diagram above and table below.

FIG. 22 shows a phase change table relative to last zone 'Lzone'. Zones can be coded to I*=(−1,0,1) and Q*=(−1,0,1) by comparing the I and Q values with a threshold.

With I and Q in two's complement
If absolute (I)>threshold then I*=sign(I) else I*=0;
If absolute (Q)>threshold then Q*=sign(Q) else Q*=0;
The original coded sequence is given in table 23 where
Several correlations are carried out
L=correlate [received (1), coded (1)]
   multiplication carried out with Xor
M=correlate [received (m), coded (m)]
   multiplication carried out with Xor
SUM=correlate [received (1+m)/2, input (1+m)/2)]
   multiplication of sign bit carried out with Xor, data bits
   And If (L+M) is negative the detector output=No_Detection
If (SUM+DIF) is negative the detector output=No_Detection
If the MSB of [(L+M)/4] multiplied by [(SUM+DIF)/4]==1
then the detector output=Sequence_Detected Having detected the measurement sequence it is a simple matter to calculate the SNR and MER from the stored samples.

Figure 24:
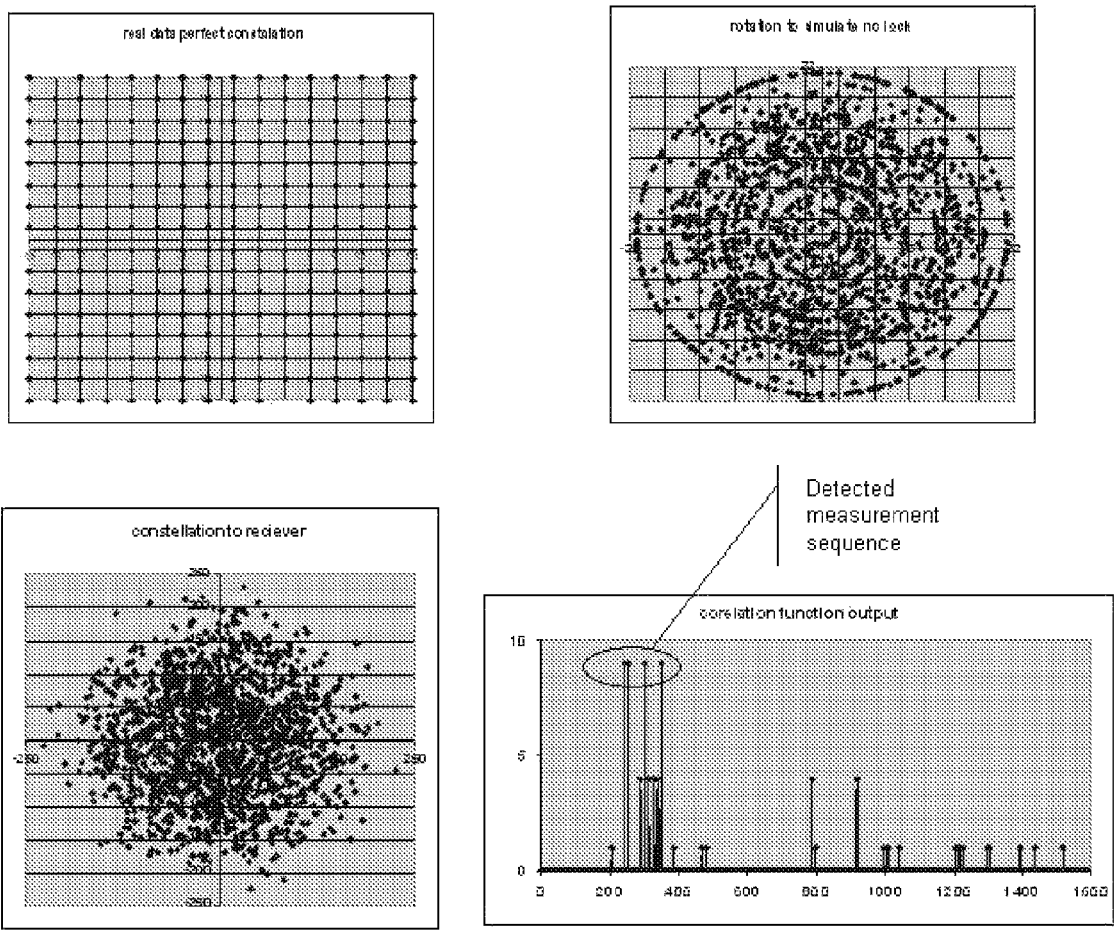
FIG. 24 illustrates simulation results performed using the present invention.

FIG. 24 illustrates simulation results performed using the invention. The measurement accuracy achieved by the invention depends not only on the ability to detect the inserted measurement symbols but also on the ability to reject sequences of random symbols that generate a false detection within the measurement sequence detector. This is especially true for noisy conditions when the receiver does not have symbol lock.

Figure 25:
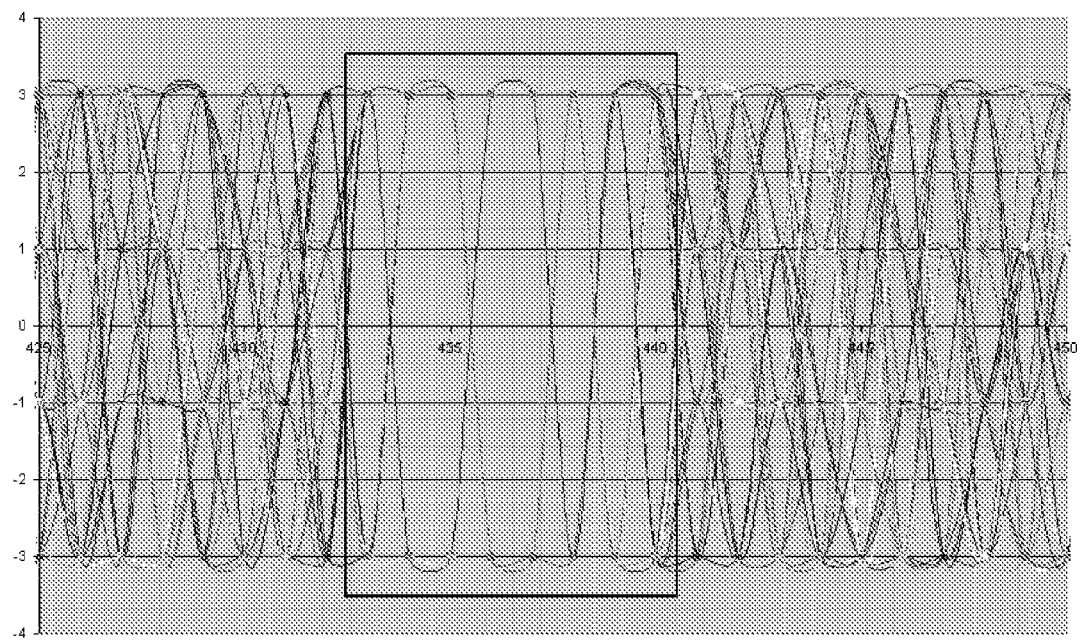
FIG. 25 shows the time domain view of the I channel of a receiver.

FIG. 25 shows the time domain view for the I channel of a receiver for a 16QAM signal in a perfect no noise conditions for 40 random data traces synchronised about the measurement sequence insertion point.

Figure 26:
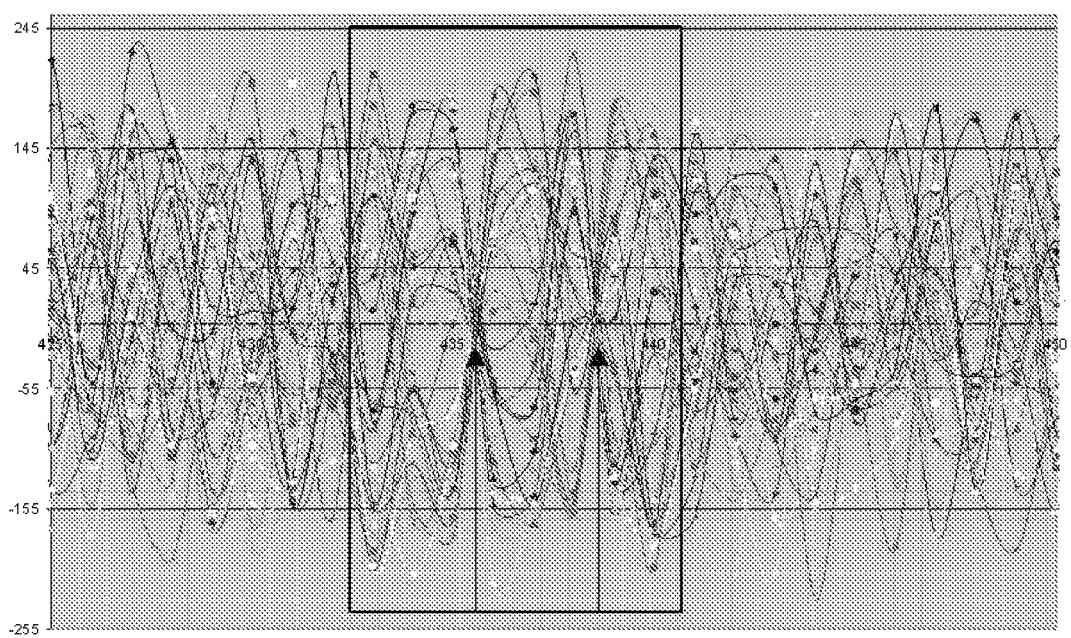
FIG. 26 shows the same view as seen in FIG. 25 but with a 9 bB SNR and an error between the receiver and actual signal symbol rates of 150 kHz.

FIG. 26 shows the same view but this time with a 9 dB SNR and an error between the receiver and actual signal symbol rates of 150 kHz. The only discernable features remaining from the original measurement sequence are the two 7 rotations indicated by the arrows. Any measurement sequence detector capable of detecting measurement sequences in these conditions will also generate false detections.

False detections are rejected by use of simple statistical analysis and not used in calculating measurement results. This can be achieved because measurement packets contain a series of measurement sequences placed at an interval much closer than would occur through genuine random noise or data.

Figures 27, 28:
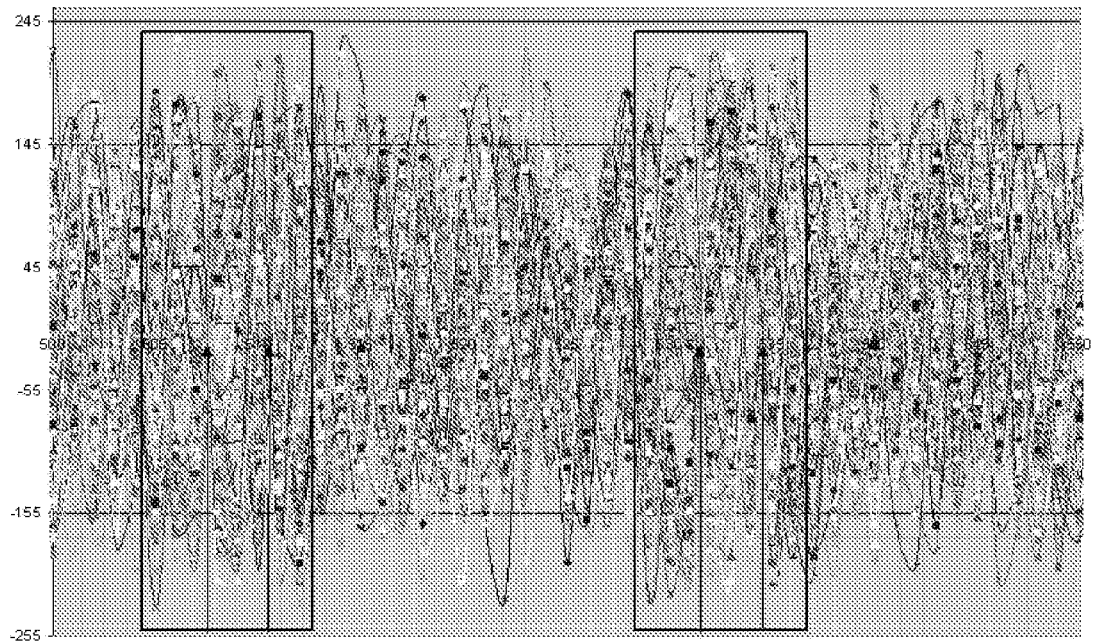
FIG. 27 shows how close two measurement symbol sequences can be placed for J83.annexA 16 QAM.
FIG. 28 illustrates a probability calculation of a 5 Msymbol stream.

FIG. 27 shows how close two measurement symbol sequences can be placed for J83.annexA 16QAM. Note that the spacing between measurement symbol sequences is dependent on the interleaver depth and modulation mode (16 QAM) used. Fifteen measurement symbol sequences are generated at this spacing by a single measurement packet insertion for J83.annexA. It is unlikely that a random occurrence of symbols will occur often enough to be confused with a series of measurement symbol sequences that result from a measurement packet insertion, as demonstrated by the analysis below.

FIG. 28 contains the probability calculation for a 5 Msymbol stream. This shows an average time between false detections of 3.5 ms. Measurement packet durations are contained in FIG. 29 for the same stream. Typically multiple measurement sequence detections (up to 15) as a result of the measurement packet can be achieved and these will occur within a maximum time of 0.14 ms.

Figures 29, 30, 31:
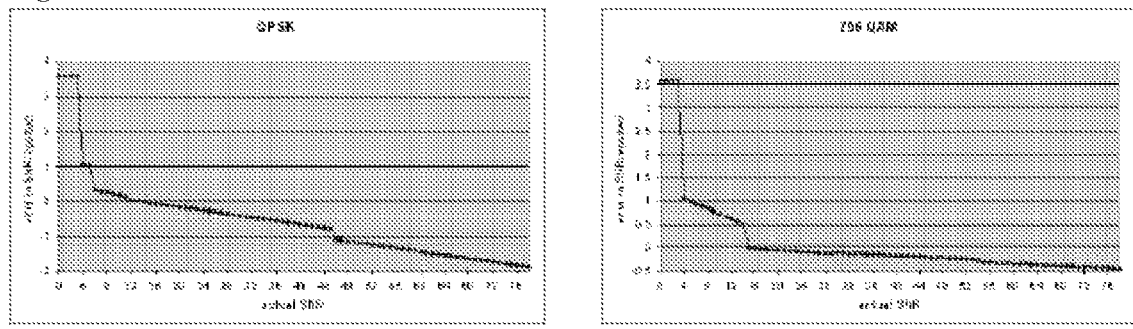
FIG. 29 is a table showing measurement packet durations.
FIG. 30 is a table showing the probability that a measurement contains false data.
FIG. 31 shows the effect false detections.
Figures 32, 33:
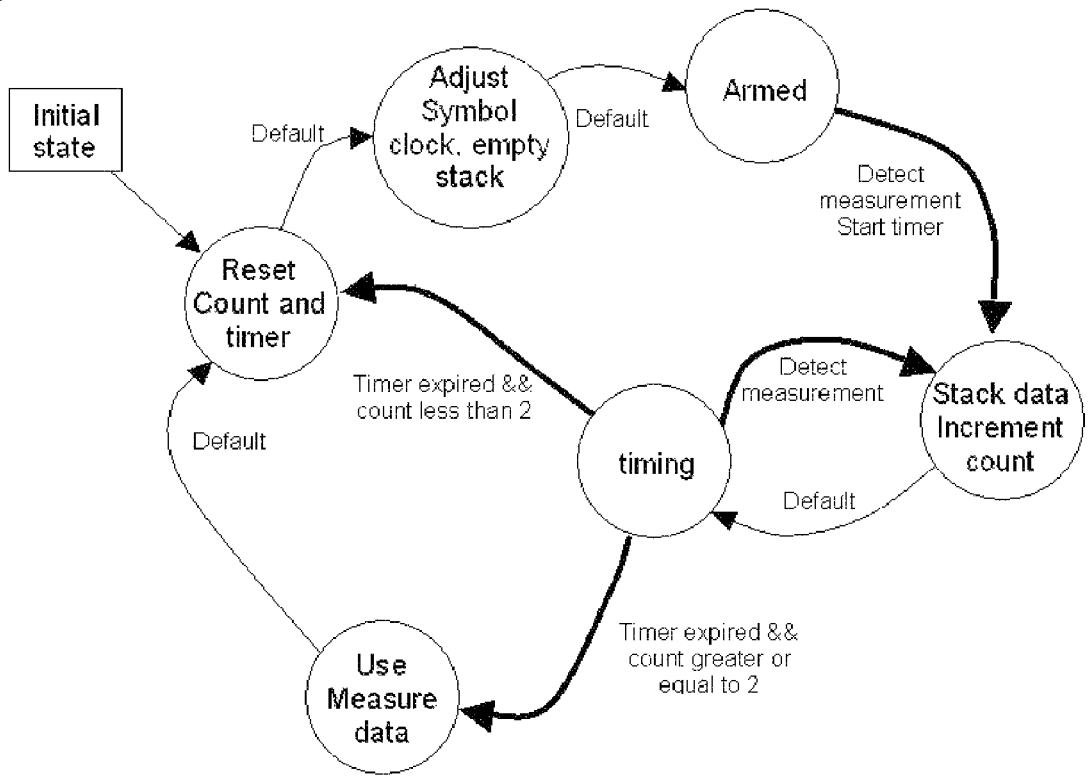
FIG. 32 shows a simple state machine capable of rejecting all single measurement sequences.
FIG. 33 shows maximum count values.

FIG. 30 contains the probability that a measurement contains false data resulting from random chance as a function of the number of measurement sequence detections within a 0.14 ms period. FIG. 31 shows the effect that the false detections have on the over all measurement accuracy given that all single measurement sequence detections are rejected, SNR below 3.5 cannot be reported, at least two measurement sequence detections per measurement packet insertion for SNR conditions below ½ lock threshold, six measurement sequence detections per measurement packet insertion between ½ lock and lock threshold, twelve measurement sequence detections per measurement packet insertion above lock threshold, once symbol lock is achieved any value below the symbol lock threshold is deemed to have come from a false detection and ignored and all false detections that are not rejected result in the worst measurement errors FIG. 32 shows a simple state machine capable of rejecting all single measurement sequences. FIG. 33 shows the maximum count values used by the state machine in FIG. 32 to determine if the Timer has expired. If the modulation mode is not known, which may occur if symbol lock is not achieved, then the QPSK count value is used.

By rejecting the highest and lowest measured value from each set of measurement sequence detections that result from one measurement packet, and averaging the remaining values, the accuracy of the measurement is further increased. FIG. 34 shows the probability that false data still remains within the averaged values, and FIG. 35 shows the effect of the few remaining false detections on the overall measurement accuracy.

Feeding the measured results from all measurement packet insertions into a moving average filter and limiting the rate of change of the filter to 3 dB per update can gain further improvement, as shown in FIG. 36

Figure 37:
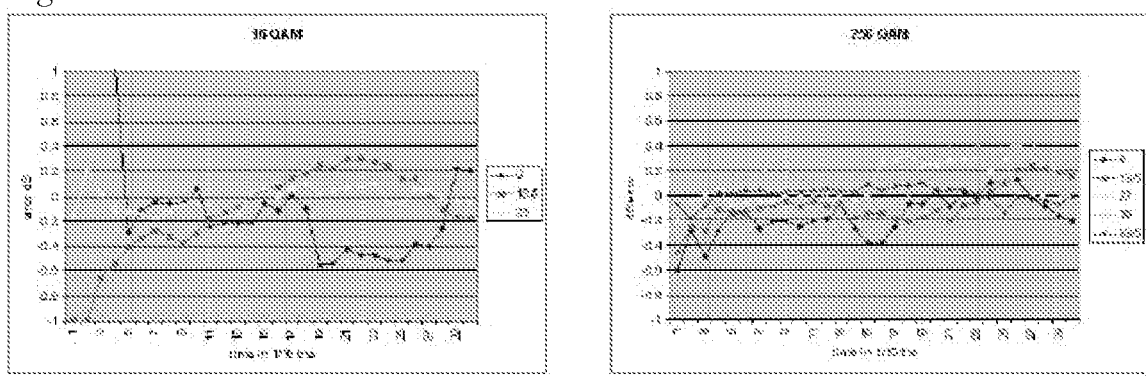
FIG. 37 shows real measured results.

FIG. 37 shows real measured results for a 10-point moving average filter for 16QAM and 256QAM for a range of input SNR. The 256QAM measurement trace converges to within ±0.5 dB of the actual SNR within 0.2 sec, but the results for 16QAM takes 0.5 sec to converge to within ±0.5 dB of the correct SNR. This is due to the increased time it takes to send a measurement packet in 16QAM mode compared with 256QAM.

This measurement system has demonstrated accuracy of ±0.5 dB over a signal range of 3.5 dB to 78 dB, regardless of modulation mode and within a settling time of less than 0.5 s. To achieve this measurement packets have been inserted into the transport but this measurement packet burden represents less than 0.027% of transport data payload for a 5.00E+06 symbol per second stream.

The invention claimed is:

1. A method of assessing the quality of data signals which are transmitted from a transmitter location to at least one data receiving location, said method including the steps of:
identifying a known signal data sequence;
inserting said known signal data sequence into the transmitted signal: and
wherein a broadcast data receiver at said at least one receiving location includes detection means to detect whether the known signal data sequence is present or not in the signal received at the receiving location, the method further including the steps of;
using a sequence detector which operates on the received samples to generate approximations of the known data signal sequence at a default symbol rate;
using a correlator to generate a correlation between the known marker symbol values and the symbol approximations; and
setting a threshold above which a correlation is determined to represent a match of correlated signals and provides symbol retiming information, where the modulation error ratio is calculated using the received retimed sample marker data sequence and the ideal representation of the mark or symbol sequence when the threshold is attained, to provide an indication of signal quality and integrity for the data transmission path between the transmitting and receiving locations;
such that when the broadcast data receiver is unable to lock to a data signal, the modulation scheme required to allow said lock may be determined without changing the applied modulation scheme, by characterizing the quality of the known signal data sequence detected.

2. A method according to claim 1 wherein the broadcast data network is a cable network and the data signals are transmitted between locations over along cable connections.

3. A method according to claim 1 wherein said method includes the step of generating the known signal data sequence and inserting the same at the data transmitter into a specific part of the transmission data stream.

4. A method according to claim 3 wherein the known signal data sequence is provided to generate a specific sequence of marks or symbols transmitted at a known frequency.

5. A method according to claim 4 wherein at the receiving location the broadcast data receiver includes a tuner which is tuned to the known frequency to receive the said known signal data sequence.

6. A method according to claim 1 wherein the method includes the means to discriminate between false and/or random correlations.

7. A method according to claim 1 wherein the method includes the step of inserting the known data signal sequence at fixed regular intervals and checking the interval between sequence correlations to see if they are coincident and rejecting matches outside this interval.

8. A method according to claim 7 wherein the method allows discrimination between false and/or random correlations by collecting a set of modulation error ratios from the matches such that they can be averaged or otherwise processed to remove the effect of false matches by the correlator.

9. A method according to claim 1 wherein results of the analysis of the received data at the broadcast data receiver include the calculation of the modulation error ratio.

10. A method according to claim 9 wherein the modulation error ratio results arc transmitted to the transmitting location from each of the receiving locations connected thereto.

11. A method according to claim 10 wherein for each receiving location a modulation scheme is selected based on the modulation error ratio results received and with reference to a look up table or predetermined parameters.

12. A method according to claim 11 wherein different modulation schemes are selected for different receiving locations.

13. A method according to claim 12 wherein calculation of the modulation error ratio occurs at regular intervals and if at any time the same changes to a sufficient degree the modulation scheme for the particular receiving location can be changed.

14. A system for the transmission of data between a transmitting location and at least one receiving location, said system comprising:
a transmitter at said transmitting location which is capable of inserting a known signal data sequence into the transmitted signal;
a broadcast data receiver at said receiving location with:
a sequence detector which operates on the received samples to generate approximations of the known data signal sequence at a default symbol rate;
a correlator for generating a correlation between the known marker symbol values and the symbol approximations, wherein a threshold is set above which a correlation is determined to represent a match of correlated signals to provide symbol retiming information; and
calculating means to calculate a modulation error ratio value when the broadcast data receiver is unable to lock to said transmitted data signal, using the received retimed sample marker data sequence and the ideal representation of the mark or symbol sequence when the threshold is attained; and wherein the modulation error ratio values provide an indication of signal quality and integrity for the data transmission path between the transmitting and receiving locations, and are returned from the broadcast data receiver to the transmitting location via a return path channel so that the modulation scheme to allow lock to be achieved may be determined.

15. A system according to claim 14 wherein at the transmitting location the modulation error ratio values are used to select from a look up table of predetermined parameters one of a range of modulation schemes.

16. A system according to claim 15 wherein the selection is based with respect to the quality of the data transmission between the locations in order to maximise spectral efficiency while maintaining a reliable symbol lock at all broadcast data receiver locations on one or more channels.

17. A system according to claim 15 wherein the selected modulation scheme is communicated to the transmitter and the selected modulation scheme is used for subsequent data transmission to the said at least one receiving location unless the quality of the data transmission is subsequently detected to have changed.

18. A system according to claim 15 wherein the selection is based with respect to the quality of the data transmission between the locations in order to maximize number of receivers able to receive data on the network while maintaining a reliable symbol lock at all broadcast data receiver locations on one or more channels.

19. A system according to claim 14 wherein the data transmission link is monitored to ascertain whether further changes in the modulation scheme are beneficial.

* * * * *

UNITED STATES PATENT AND TRADEMARK OFFICE
CERTIFICATE OF CORRECTION

| | | |
|---|---|---|
| PATENT NO. | : 7,773,711 B2 | Page 1 of 1 |
| APPLICATION NO. | : 11/514782 | |
| DATED | : August 10, 2010 | |
| INVENTOR(S) | : Beales | |

It is certified that error appears in the above-identified patent and that said Letters Patent is hereby corrected as shown below:

On Title page
    Item (73) Assignee, insert --Pace Pic, Saltaire, Shipley (GB)--

Signed and Sealed this
Twenty-first Day of June, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,773,711 B2 | Page 1 of 1 |
| APPLICATION NO. | : 11/514782 | |
| DATED | : August 10, 2010 | |
| INVENTOR(S) | : Beales | |

It is certified that error appears in the above-identified patent and that said Letters Patent is hereby corrected as shown below:

On Title page
    Item (73) Assignee, insert --Pace P/C, Saltaire, Shipley (GB)--

This certificate supersedes the Certificate of Correction issued June 21, 2011.

Signed and Sealed this
Tenth Day of January, 2012

David J. Kappos
*Director of the United States Patent and Trademark Office*